United States Patent [19]

Soechting et al.

[11] Patent Number: 5,645,397
[45] Date of Patent: Jul. 8, 1997

[54] TURBINE VANE ASSEMBLY WITH MULTIPLE PASSAGE COOLED VANES

[75] Inventors: Friedrich O. Soechting; William L. Plank, both of Tequesta, Fla.; Kenneth B. Hall, Klingnau, Switzerland

[73] Assignee: United Technologies Corporation, Hartford, Conn.

[21] Appl. No.: 541,854

[22] Filed: Oct. 10, 1995

[51] Int. Cl.$^6$ ........................................................ F01D 9/06
[52] U.S. Cl. ............................................ 415/115; 416/97 R
[58] Field of Search ................................... 415/115, 176; 416/97 R, 96 A

[56] References Cited

U.S. PATENT DOCUMENTS

| | | | |
|---|---|---|---|
| 4,278,400 | 7/1981 | Yamarik et al. | 415/115 |
| 4,296,599 | 10/1981 | Adamson | 415/115 |
| 4,515,526 | 5/1985 | Levengood | 416/96 R |
| 4,767,268 | 8/1988 | Auxier et al. | 416/97 R |
| 4,775,296 | 10/1988 | Schwarzmann et al. | 416/97 R |
| 4,898,514 | 2/1990 | McCracken | 416/95 |
| 5,207,556 | 5/1993 | Frederick et al. | 415/115 X |
| 5,320,485 | 6/1994 | Bourguignon et al. | 415/115 |
| 5,403,159 | 4/1995 | Green et al. | 416/97 R |
| 5,498,126 | 3/1996 | Pigetti et al. | 415/115 |

*Primary Examiner*—John T. Kwon
*Attorney, Agent, or Firm*—Richard D. Getz

[57] ABSTRACT

A vane assembly for a gas turbine engine is provided, which includes a plurality of vanes, an inner vane support, a casing, and apparatus for maintaining a pressure difference. Each vane has a leading edge, a trailing edge, an outer radial end, an inner radial end, and an internal cavity. The internal cavity includes a forward compartment adjacent the leading edge and an aft compartment adjacent the trailing edge. The casing, which includes an annulus, is positioned radially outside of the vanes. The vanes extend between the inner vane support and the casing. The apparatus for maintaining a pressure difference maintains a difference in the cooling air pressure within the forward and aft compartments of the vane cavity under operating conditions.

12 Claims, 2 Drawing Sheets

TURBINE VANE ASSEMBLY WITH MULTIPLE PASSAGE COOLED VANES

The Invention was made under a U.S. Government contract and the Government has rights herein.

BACKGROUND OF THE INVENTION

1. Technical Field

This invention relates to gas turbine engines in general, and cooled turbine vane assemblies in particular.

2. Background Information

Turbine sections within an axial flow turbine engine generally include a plurality of rotor assemblies and stationary vane assemblies. The rotor assemblies, each comprising a disk and a plurality of rotor blades circumferentially disposed around the disk, rotate about an axis extending through the turbine engine. The vane assemblies, disposed forward and/or aft of each rotor assembly, include a plurality of vanes and an inner vane support. The outer radial end of each vane is fixed to the casing of the turbine section and the inner radial end of each vane is fixed to the inner vane support.

The thermal environment within the turbine section necessitates cooling both the vane assemblies and the rotor assemblies, although the amount of cooling required depends upon the power setting of the engine. Typically, air at a pressure higher and a temperature lower than that of the core gas flow will be passed through the vane and rotor assemblies as a cooling medium. Bypass air originating from a fan section, or air bled off of a compressor section, provides the cooling air at the higher pressure and lower temperature. In some turbine stages, cooling air passes through the vanes and into the vane support before being directed into an aft rotor assembly by a plurality of tangential on-board injectors (also known as TOBI's). The TOBI's, which are formed within or attached to the inner vane support, direct the air exiting the inner vane support in a direction substantially parallel to the rotor assembly plane of rotation. The injectors are aligned within disk inlet orifices, thereby enabling cooling air exiting the vane support to enter the disk of the rotor assembly and pass thereafter up and into the blades.

A person of skill in the art will recognize that there is a tension between the need to cool the turbine sections and the efficiency of the engine. It is often desirable to cool the turbine sections with air bled from a compressor stage, for example, because it has been worked to a higher pressure and therefore has the energy necessary to travel through a vane assembly and a subsequent rotor assembly. A significant percentage of the work imparted to the air bled from the compressor, however, is lost during the cooling process. The lost work does not add to the thrust of the engine and therefore negatively effects the overall efficiency of the engine.

To minimize the amount of energy lost in the cooling process, it is known to add flow restricting devices either upstream of where cooling air enters each vane, or immediately inside each vane. The flow restricting devices conserve energy by limiting the flow of cooling air into each vane. A consequence of limiting the flow, however, is a pressure drop across the restricting device. The amount of pressure drop permissible is limited because a minimum pressure must be maintained within each vane to prevent the inflow of hot core gas flow, or in the case of a TOBI arrangement the minimum pressure may be that which is necessary to cool the aft rotor assembly. Another consideration in cooling air pressure is the cross-sectional area of apertures within the vanes through which cooling air may exit the vane and pass out into the core gas flow. Theoretically, apertures can be designed which satisfy the cooling needs of the vane and help maintain the minimum pressure necessary within the vane along the leading edge. In reality, however, the cross-sectional area of those optimum apertures is so small that the apertures are either impossible to cast within the vanes, or are cost prohibitive to machine in the vanes. Apertures having a cross-sectional area greater than optimum are therefore utilized, and additional flow is required within the blade to maintain the minimum required pressure. Hence, there is a limit to the extent which cooling air flow can be restricted under presently available vane design.

A further complication in the tension between efficiency and cooling is the future direction of compressor design. For a variety of reasons, it is advantageous to minimize the numbers of compressor stages within a gas turbine engine. Decreasing the number of compressors does not, however, decrease the work requirement of the compressor stages. On the contrary, with fewer number of compressor stages, each stage is required to do more work. Increasing the work of each compressor stage, increases the jump in output gas pressure and temperature between each stage. At present, cooling air is bled off of the compressor stage having an output pressure closest to the minimum required pressure for cooling purposes. Minimizing the difference between the bled gas pressure and the minimum required cooling air pressure, minimizes the amount of work lost to cooling. In future compressor designs, the "jumps" between compressor stages will be greater, thereby potentially increasing the difference in pressure available and that needed for cooling purposes and therefore decreasing the efficiency of the engine.

What is needed, therefore is a turbine vane assembly that may be adequately cooled using a minimum of cooling air, thereby increasing the efficiency of the engine.

DISCLOSURE OF THE INVENTION

It is, therefore, an object of the present invention to provide a turbine vane assembly that may be adequately cooled.

It is another object of the present invention to provide a turbine vane assembly that uses a minimum amount of cooling air, and therefore maximizes engine efficiency.

It is still another object of the present invention, to provide a turbine vane assembly that includes means for modulating the flow of cooling air through the vane assembly.

According to the present invention, a vane assembly for a gas turbine engine is provided, which includes a plurality of vanes, an inner vane support, a casing, and means for maintaining a pressure difference. Each vane has a leading edge, a trailing edge, an outer radial end, an inner radial end, and an internal cavity. The internal cavity includes a forward compartment adjacent the leading edge and an aft compartment adjacent the trailing edge. The casing, which includes an annulus, is positioned radially outside of the vanes. The vanes extend between the inner vane support and the casing. The means for maintaining a pressure difference maintains a difference in the pressure of the cooling air passing through the forward and aft compartments of the vane cavity under operating conditions.

In one embodiment of the present invention, the means for maintaining a pressure difference between the forward and aft compartments of the vane cavity is disposed in the casing of the vane assembly.

In another embodiment of the present invention, the means for maintaining a pressure difference between the forward and aft compartments of the vane cavity is disposed in the vanes of the vane assembly.

According to one aspect of the present invention, a means for modulating the amount of cooling air passing through the vanes is provided. The cooling air flow may be modulated commensurate with the cooling requirements of the vane assembly, while maintaining a vane cavity pressure higher than that of the core gas flow.

An advantage of the present invention is that it minimizes the amount of cooling air required to cool a vane assembly. Providing forward and aft compartments within the vane cavity, and positioning a flow meter such that cooling air entering the aft compartment must pass through the flow meter, makes it possible to provide the appropriate amount of cooling air to a particular region within a vane at the lowest allowable pressure. Core gas flow at the leading edge of a vane, for example, is at a higher average pressure than core gas flow at the trailing edge of a vane. Hence, the danger of hot core gas inflow is greater at the leading edge than at the trailing edge. In the prior art, the problem was solved by pressurizing the vane cavity to the minimum required along the leading edge. This solution prevented hot core gas inflow, but also wasted energy by forcing cooling air flow out the trailing edge in excess of that necessary to cool the trailing edge. The present invention, in contrast, solves the problem by allowing cooling air at a first pressure in the forward compartment and cooling air at a second, lower pressure in the aft compartment. As a result, hot core gas inflow is prevented along the leading edge, without dumping excess amounts of cooling air along the trailing edge and vane platform edges.

In the case of a TOBI cooled rotor assembly aft of the vane assembly, the forward compartments of the present invention also enable cooling air to pass through the vanes and into the TOBI's at a higher pressure. The compartmentalization of the cavity and the minimal resistance path through the forward compartment, help avoid the minimum pressure within the vane cavity being dictated by the TOBI requirements.

Another advantage of the present invention is that the compartments of the present invention permit the flow of cooling air between the cooling air source and the vane assembly to be modulated commensurate with the cooling requirements of the vane assembly. Gas turbine engines, particularly those used in performance aircraft, operate within a large envelope which encompasses a variety of power settings. The cooling requirements of the engine turbine vane assemblies are directly related to the power setting of the engine. In prior art vane design, the window between the minimum pressure required within the vane cavities and the amount of cooling air flow actually passed through the vanes, is small enough such that it is impractical to modulate the flow commensurate with the power setting of the engine. Utilizing the present invention, however, the minimum amount of cooling air pressure required is decreased and the window therefore expanded. As a result, the cooling air flow through the vane assemblies may now be modulated commensurate with the power setting of the engine and the efficiency of the engine increased.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
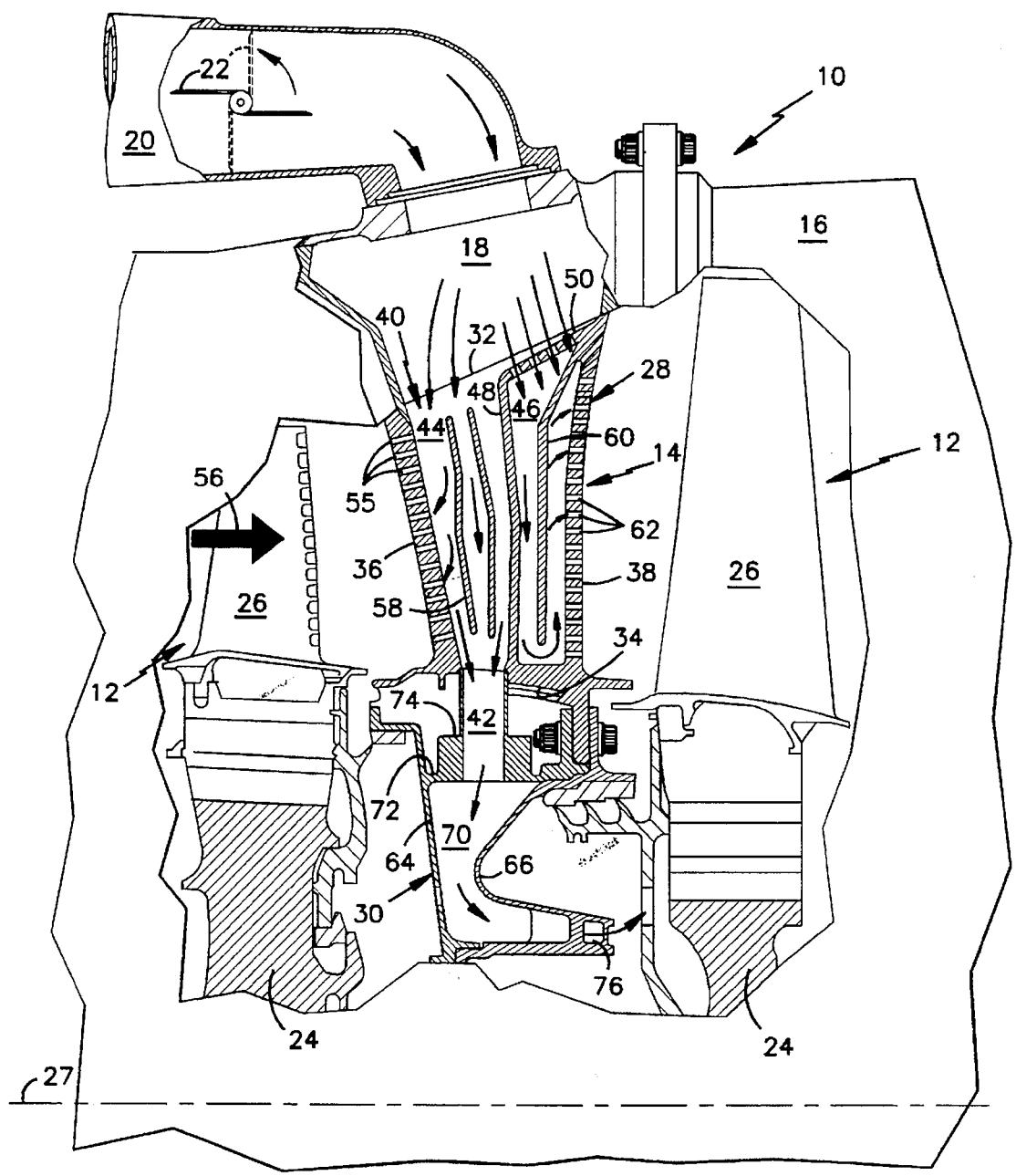
FIG. 1 is a diagrammatic view of a turbine section within a gas turbine engine showing a first embodiment of the present invention.

Referring to FIG. 1, a gas turbine engine includes a turbine section 10 having a plurality of rotor assemblies 12 and vane assemblies 14 disposed within a casing 16. The casing 16 includes an annulus 18 disposed radially outside of the vane assemblies 14. The annulus 18 is connected to a cooling air source (not shown) by a plurality of transfer pipes 20. Each transfer pipe 20 contains a valve 22 for modulating the flow of cooling air through the pipes 20. Each rotor assembly 12 includes a disk 24 and a plurality of rotor blades 26 circumferentially disposed around the disk 24, for rotation about the central axis 27 of the turbine engine. The vane assemblies 14, one of which is disposed aft of each rotor assembly 12, include a plurality of vanes 28 supported by an inner vane support 30. Each vane 28 includes an outer radial end 32, an inner radial end 34, a leading edge 36, a trailing edge 38, an internal cavity 40, and a cooling air exhaust passage 42.

The internal cavity 40 of each vane 28 includes a forward compartment 44 adjacent the leading edge 36, and an aft compartment 46 adjacent the trailing edge 38. In a first embodiment shown in FIG. 1, the vane 28 extends up to and is received by the annulus 18 within the casing 16. The two compartments 44, 46 within the vane cavity 40 are separated by a wall 48 and a flow meter 50 disposed within the vane cavity 40. The flow meter 50 permits a percentage of the cooling air flow passing through the vane cavity 40 to pass through the aft compartment 46, and the wall 48 prevents further passage of cooling air into the aft compartment 46. In a second embodiment shown in FIG. 2, the vane compartments 44, 46 are completely separated by a wall 48, a jumper tube 52 connects the forward compartment 44 to the annulus 18, and a flow meter 54, disposed between the annulus 18 and the aft compartment 46, provides a path through which cooling air may enter the aft compartment 46. The cooling air exhaust passage 42 in both embodiments is fixed to, or formed within, the inner radial end 34 of the vane 28, and extends between the inner vane support 30 and the forward compartment 44.

Figure 2:
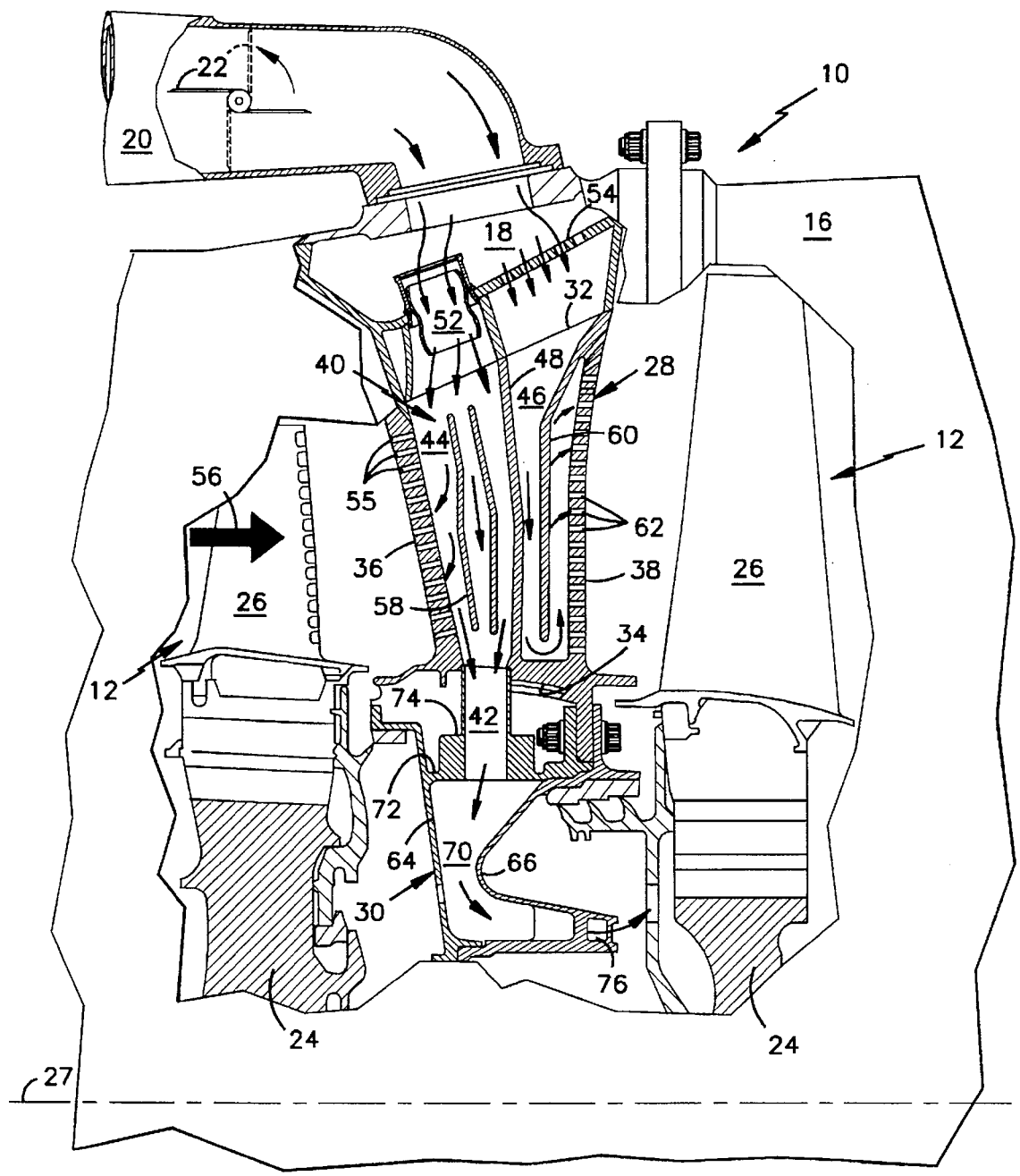
FIG. 2 is a diagrammatic view of a turbine section within a gas turbine engine showing a second embodiment of the present invention.

Referring to FIGS. 1 and 2, in both embodiments the leading edge 36 of each vane 28 includes a plurality of apertures 55 through which cooling air may exit the forward compartment 44 and mix with core gas flow 56. The forward compartment 44 may also include a plurality of dividers 58 to direct the cooling air flow through the forward compartment 44. In both embodiments, the aft compartment 46 includes a serpentine arrangement of dividers 60 for directing the flow of cooling air through the aft compartment 46. Apertures 62 disposed along the trailing edge 38 provide an exit path for cooling air within the aft compartment 46.

The inner vane support 30 is formed from a forward member 64 and an aft member 66 that bolt together to form an annulus 70. The outer radial surface 72 of the inner vane support 30 includes a plurality of seats 74, circumferentially disposed around the support 30, for receiving the inner radial ends 34 of the vanes 28. The aft member 66 includes a plurality of tangential on-board injectors 76 (also known as TOBI's), circumferentially disposed around the aft member 66.

Operating conditions for the engine may be described as the engine operating in a steady-state condition, correlating to the power setting of the engine. Work is imparted to the air within the compressor and fan sections (not shown) before fuel is added and the mixture combusted. Some of the worked air is bled off and directed through transfer pipes 20 to the turbine section 10 for cooling purposes. For sake of clarity, air bled off of either a fan section or a compressor section may hereafter be referred to as "cooling air". Under full power, turbine cooling demands are at a peak and the modulation valves 22 disposed within the transfer pipes 20 admit all of the gas bled off to the annulus 18 within the casing 16. Under less than full power settings, turbine cooling demands are less than peak and the modulation valves 22 can be adjusted to admit less than all of the bled air to the annulus 18. As a result, the consumption of the cooling air decreases and the efficiency of the engine increases.

Referring to FIG. 1, in the first embodiment cooling air admitted to the annulus 18 passes into the individual vanes 28. A portion of the cooling air entering a particular vane 28 passes directly into the forward compartment 44 of the vane 28 and the remainder passes first through the flow meter 50 and subsequently into the aft compartment 46 of the vane 28. Flow passing through the forward compartment 44 maintains a higher overall pressure than that of the flow passing through the aft compartment 46 because of the flow impediment provided by the flow meter 50. A percentage of the flow passing through the forward compartment 44 exits through the apertures 55 disposed along the leading edge 36. The remainder of the flow passing through forward compartment 44, less that lost to leakage, exits the vane 28 and enters the inner vane support 30 through the cooling air exhaust passage 42. The TOBI's 76 subsequently direct the flow toward the disk 24 of the aft rotor assembly 12. Flow entering the aft compartment 46 is directed through a serpentine path for cooling purposes before exiting the vane 28 through a plurality of apertures 62 disposed along the trailing edge 38.

Referring to FIG. 2, in the second embodiment a portion of the cooling air admitted into the annulus 18 passes through the jumper tubes 52 and into the forward compartments 44 of the individual vanes 28. The difference in overall gas pressure between that within the annulus 18 and that within the forward compartments 44 is minimal, as the jumper tubes 52 provide minimal resistance to flow passing into the forward compartments 44. The remainder of the cooling air within the annulus 18, less that lost to leakage, passes through the flow meter 54 before entering the aft compartment 46. Once the cooling air has entered the forward 44 and aft 46 compartments in the second embodiment, the gas takes the same paths as those described above for the first embodiment.

Although this invention has been shown and described with respect to the detailed embodiments thereof, it will be understood by those skilled in the art that various changes in form and detail thereof may be made without departing from the spirit and the scope of the invention.

We claim:

1. stationary vane assembly for a gas turbine engine, comprising:

a plurality of vanes, each vane having a leading edge, a trailing edge, an outer radial end, an inner radial end, and an internal cavity, said internal cavity including a forward compartment adjacent said leading edge, and an aft compartment adjacent said trailing edge;

an inner vane support, said inner vane support having a plurality of seats for receiving said inner radial ends of said vanes, and a plurality of exit apertures through which cooling air may exit said inner vane support; and an outer casing, positioned radially outside of said vanes, having an annulus disposed within said outer casing, wherein said outer radial ends of said vanes attach to said outer casing;

a plurality of jumper tubes, extending between said annulus and said forward compartment, said jumper tubes providing a travel path for cooling air between said annulus and said forward compartments; and a flow meter, positioned between said annulus and said aft compartment of each said vane cavity, wherein cooling air traveling between said annulus and said aft compartments must pass through said flow meter.

2. A stationary vane assembly according to claim 1, wherein under operating conditions said flow meter restricts the flow of cooling air into said aft compartment such that a first difference in pressure between said annulus and said aft compartments is greater than a second difference in pressure between said annulus and said forward compartments.

3. A stationary vane assembly according to claim 1, wherein under operating conditions, said flow meter restricts the flow of cooling air into the aft compartment of each vane, thereby creating a difference between the pressure in the aft compartment and the pressure in the forward compartment.

4. A stationary vane assembly according to claim 1, further comprising:

transfer piping, extending between a gas source and said annulus, for transferring cooling air to said annulus;

modulating valve means, disposed within said transfer piping, for modulating the flow of cooling air into said annulus.

5. A stationary vane assembly according to claim 2, further comprising:

transfer piping, extending between a gas source and said annulus, for transferring cooling air to said annulus;

modulating valve means, disposed within said transfer piping, for modulating the flow of cooling air into said annulus.

6. A stationary vane assembly according to claim 5, wherein said exit apertures of said inner vane support are nozzles formed to direct air in a plane parallel to an axis of rotation of an aft rotor assembly.

7. A stationary vane assembly according to claim 6, wherein each said vanes further comprises a cooling air exhaust passage extending between said forward compartment of said vane and said inner vane support.

8. A stationary vane assembly for a gas turbine engine, comprising:

a plurality of vanes, each vane having a leading edge, a trailing edge, an outer radial end, an inner radial end, and an internal cavity, said internal cavity including a forward compartment adjacent said leading edge, and an aft compartment adjacent said trailing edge, said compartments separated from each other by a wall and a flow meter;

an inner vane support, having a plurality of seats for receiving said inner radial ends of said vanes and a plurality of exit apertures through which cooling air may exit said inner vane support a passage, extending between each said forward compartment and said inner vane support, wherein said passage provides minimal resistance to cooling air passing through each said forward compartment into said inner vane support; and an outer casing, positioned radially outside of said vanes, having an annulus disposed within said outer casing, wherein said outer radial ends of said vanes attach to said outer casing, and said annulus is in communication with each said vane cavity such that cooling air within said annulus may exit said annulus and pass into each said vane cavity;

wherein a portion of said cooling air passing into said vanes, passes into said forward compartment, and a portion of said cooling air passes through said flow meter into said aft compartment.

9. A stationary vane assembly according to claim 8, wherein said exit apertures of said inner vane support are nozzles for feeding air to a rotor assembly positioned adjacent said stationary vane assembly.

10. A stationary vane assembly according to claim 9, wherein said flow meter restricts the passage of cooling air into said aft compartment such that a first difference in pressure between said annulus and said aft compartments is greater than a second difference in pressure between said annulus and said forward compartments.

11. A stationary vane assembly according to claim 9, further comprising:

transfer piping, extending between a gas source and said annulus, for transferring cooling air to said annulus;

modulating valve means, disposed within said transfer piping, for modulating the flow of cooling air into said annulus.

12. A turbine vane, comprising:

a leading edge, opposite a trailing edge;

a first radial end, opposite a second radial end;

an internal cavity, including a forward compartment adjacent said leading edge, and an aft compartment adjacent said trailing edge, said cavity extending between said radial ends;

a flow meter, disposed within said cavity, wherein said compartments are separated from each other by said flow meter and a wall, and cooling air within said cavity must pass through said flow meter before entering said aft compartment; and a cooling air exhaust passage extending out of said first radial end from said forward compartment, thereby providing a passage through which cooling air may exit said forward compartment.

* * * * *

UNITED STATES PATENT AND TRADEMARK OFFICE
CERTIFICATE OF CORRECTION

PATENT NO. : 5,645,397
DATED : July 8, 1997
INVENTOR(S) : Friedrich O. Soechting, William L. Plank, Kenneth B. Hall It is certified that error appears in the above-indentified patent and that said Letters Patent is hereby corrected as shown below:

In column 3 at line 40, change "the cavity" to --the vane cavity--.

Signed and Sealed this

Twelfth Day of May, 1998

Attest:

BRUCE LEHMAN

*Attesting Officer*  *Commissioner of Patents and Trademarks*